United States Patent
Sarrafan et al.

(10) Patent No.: US 11,540,279 B2
(45) Date of Patent: Dec. 27, 2022

(54) WIDE BAND SENSING OF TRANSMISSIONS IN FDM SIGNALS CONTAINING MULTI-WIDTH CHANNELS

(71) Applicant: Meteorcomm, LLC, Renton, WA (US)

(72) Inventors: Shiva Sarrafan, Renton, WA (US); Arun Naidu, Woodinville, WA (US); Mark Davies, Renton, WA (US)

(73) Assignee: Meteorcomm, LLC, Renton, WA (US)

( * ) Notice: Subject to any disclaimer, the term of this patent is extended or adjusted under 35 U.S.C. 154(b) by 74 days.

(21) Appl. No.: 16/926,761

(22) Filed: Jul. 12, 2020

(65) Prior Publication Data
US 2021/0136760 A1    May 6, 2021

Related U.S. Application Data

(60) Provisional application No. 62/873,830, filed on Jul. 12, 2019.

(51) Int. Cl.
| | |
|---|---|
| H04W 72/04 | (2009.01) |
| H04L 5/06 | (2006.01) |
| H04W 24/02 | (2009.01) |
| H04W 24/06 | (2009.01) |

(52) U.S. Cl.
CPC .......... H04W 72/0453 (2013.01); H04L 5/06 (2013.01); H04W 24/02 (2013.01); H04W 24/06 (2013.01)

(58) Field of Classification Search
None
See application file for complete search history.

(56) References Cited

U.S. PATENT DOCUMENTS

| | | | |
|---|---|---|---|
| 568,101 | A | 9/1896 | Rouse |
| 4,582,280 | A | 4/1986 | Nichols |
| 4,736,371 | A | 4/1988 | Tejima et al. |
| 5,039,038 | A | 8/1991 | Nichols |
| 5,065,398 | A | 11/1991 | Takashima |

(Continued)

FOREIGN PATENT DOCUMENTS

| | | | |
|---|---|---|---|
| CN | 101345726 A | * | 1/2009 |
| WO | 2010059312 A1 | | 5/2010 |

OTHER PUBLICATIONS

Fredric J. Harris et al.; "Digital Receivers and Transmitters Using Polyphase Filter Banks for Wireless Communications"; IEEE Transactions on Microwave Theory and Techniques; vol. 51, No. 4; Apr. 2003; pp. 1395-1412; DOI: 10.1109/TMTT.2003.809176.

(Continued)

*Primary Examiner* — The Hy Nguyen
(74) *Attorney, Agent, or Firm* — Hubbard Law, PLLC (57) ABSTRACT

A radio for determining the occupancy of a variable width channel for secondary use, the variable width channel with a bandwidth equal to an integer multiple of the bandwidth of a plurality of narrowband channels in an RF frequency band. The radio decides whether the variable width channel in the RF band is occupied by whether classifying each of the narrowband channels corresponding to the variable width channel and each of a plurality of sub-bands with bandwidths of narrowband channels but center frequencies shifted by one-half of the bandwidth of the narrowband channel and overlap with the bandwidth of the variable width channel as containing signal or noise based on measured energy levels.

8 Claims, 7 Drawing Sheets

(56) References Cited

U.S. PATENT DOCUMENTS

| | | | |
|---|---|---|---|
| 5,267,473 | A | 12/1993 | Bezos |
| 5,377,938 | A | 1/1995 | Bezos |
| 5,681,015 | A | 10/1997 | Kull |
| 5,720,455 | A | 2/1998 | Kull |
| 5,757,291 | A | 5/1998 | Kull |
| 6,072,993 | A | 6/2000 | Trikha |
| 6,115,435 | A | 9/2000 | Harada |
| 6,269,116 | B1 | 7/2001 | Javerbring |
| 6,505,104 | B2 | 1/2003 | Collins |
| 6,577,610 | B1 | 6/2003 | Kronz |
| 7,042,954 | B2 | 5/2006 | Ha |
| 7,467,032 | B2 | 12/2008 | Kane |
| 7,742,850 | B2 | 6/2010 | Kane |
| 8,098,645 | B2 | 1/2012 | Yee et al. |
| 8,279,796 | B1 | 10/2012 | Cleveland |
| 8,340,056 | B2 | 12/2012 | Siriwongpairat |
| 8,582,694 | B2 | 11/2013 | Velazquez et al. |
| 8,602,574 | B1 | 12/2013 | Alvi |
| 9,037,625 | B2 | 5/2015 | Sturza et al. |
| 9,112,735 | B1 | 8/2015 | Harris |
| 9,379,576 | B2 | 6/2016 | Al Jaeedi |
| 9,398,587 | B1* | 7/2016 | Kong .................. H04W 24/02 |
| 9,450,688 | B1 | 9/2016 | Murphy |
| 9,669,850 | B2 | 6/2017 | Fuchs |
| 10,160,466 | B1 | 12/2018 | Potter |
| 10,710,620 | B2 | 7/2020 | Potter |
| 2003/0103589 | A1* | 6/2003 | Nohara .................. H04K 3/82 375/350 |
| 2004/0001561 | A1 | 1/2004 | Dent |
| 2005/0149339 | A1* | 7/2005 | Tanaka ................. G10L 21/038 704/E21.011 |
| 2007/0170314 | A1 | 7/2007 | Kane |
| 2007/0236079 | A1 | 10/2007 | Kull |
| 2009/0074101 | A1 | 3/2009 | Tang |
| 2010/0020235 | A1* | 1/2010 | Bouillet .................. H04N 5/21 348/E5.009 |
| 2010/0130124 | A1 | 5/2010 | Teeter |
| 2013/0136075 | A1* | 5/2013 | Yu .......................... H04L 1/0026 370/329 |
| 2017/0088153 | A1 | 3/2017 | Fernandes |
| 2018/0019831 | A1* | 1/2018 | Zhang .................. H04B 1/001 |
| 2022/0006601 | A1* | 1/2022 | Zhu ......................... H04L 5/003 |

OTHER PUBLICATIONS

AAR Manual of Standards and Recommended Practices Office Architecture and Railroad Electronics Messaging, Class C IMessaging, Standard S-9355.V1.0, Aug. 2014, 4 pages.
AAR Manual of Standards and Recommended Practices Office Architecture and Railroad Electronics Messaging, Class D Messaging, Standard S-9346.V1.0, 2010, 34 pages.
AAR Manual of Standards and Recommended Practices Office Architecture and Railroad Electronics Messaging, Edge Message Protocol, Standard S-9354.V2.0, Implemented Oct. 2018, 18 pages.
Fatih Genc et al., "On the Optimum Ring Ratio Determination for 16-DAPSK Modulation in OFDM Systems", 2014 IEEE 22nd Signal Processing and Communications Applications Conference (SIU 2014), 4 pages.
Hewavithana et al., "Soft Decisions for DQPSK Demodulation for the Viterbi Decoding of the Convolutional Codes", ICASSP 2003, 4 pages.
Meteorcomm LLC, "ITCnet Common Air Interface", 2013, 46 pages.
Meteorcomm LLC, "ITCR 1.1 System Architecture Specification", Doc Revision: 4.0, Doc No. 00002542-A, 2012, 88 pages.
Progress Rail, "Guardian End-of-Train Device", progressrail.com, Oct. 14, 2020, 2 pages.
Siemens, "Rail Automation, End of Train Device, Locomotive Onboard Equipment", usa.siemens.com/rail-automation, 2015, 2 pages.

* cited by examiner

Detected Energy by narrow filter bank.

WIDE BAND SENSING OF TRANSMISSIONS IN FDM SIGNALS CONTAINING MULTI-WIDTH CHANNELS

RELATED APPLICATION

This application claims priority to U.S. provisional application 62/873,830, filed Jul. 12, 2019, which is incorporated by reference in its entirety for all purposes.

FIELD OF INVENTION

The following disclosure relates to detection by a radio frequency (RF) receiver of transmissions within a predefined RF band to identify unused portions of the band for opportunistic secondary transmissions.

BACKGROUND

Governmental regulations for radio frequency transmissions for a predefined frequency band includer a specification that specify for the band a number of predefined channels. Each channel will have pre-defined bandwidth(s) and a channel center frequency to which RF transmissions within the band must adhere. The channel specification also usually specifies a framework for sharing channels and reusing frequencies.

Figure 1:
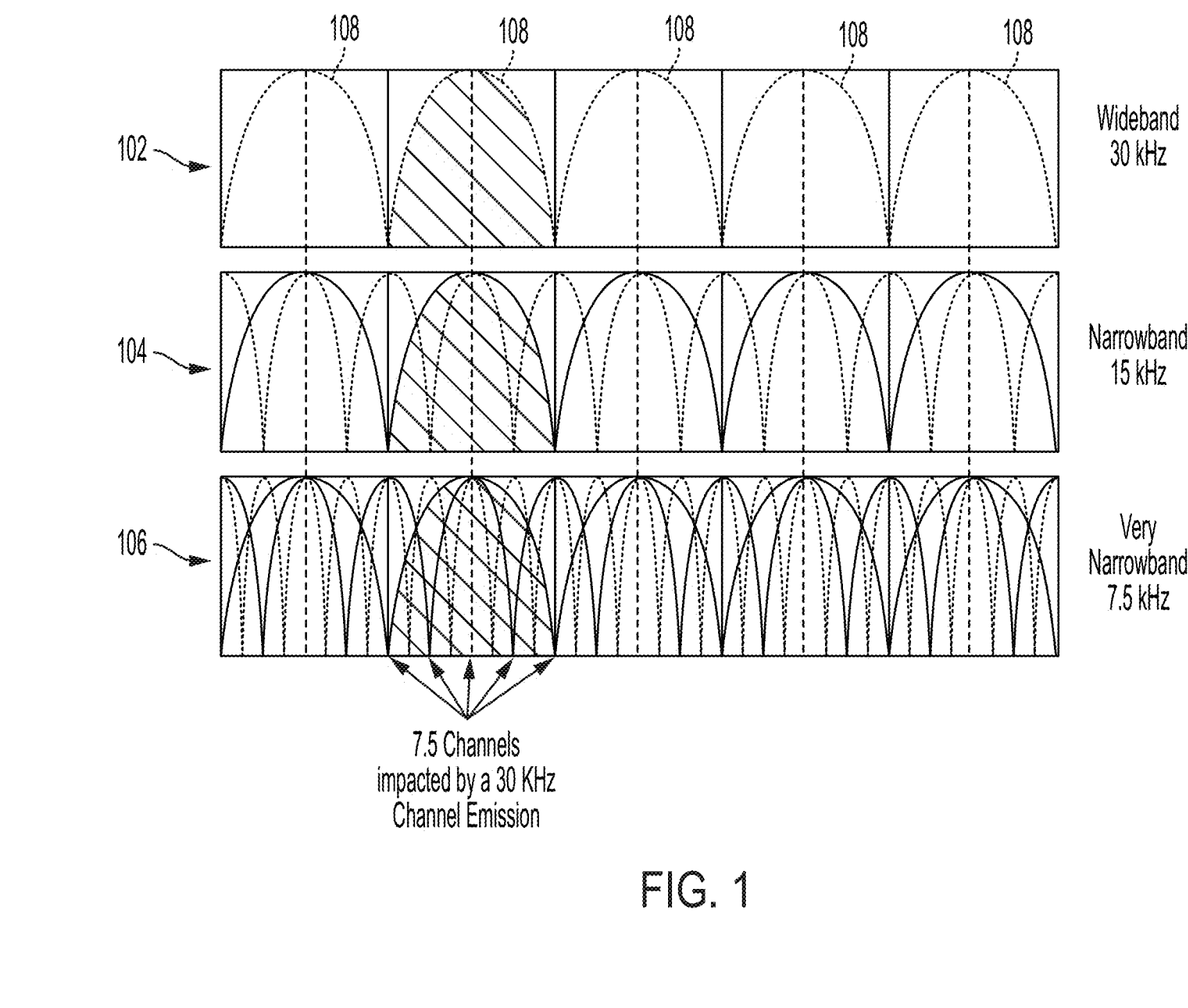
FIG. 1 is a schematic illustration of VHF band channelization with shared center frequencies

A frequency division multiplexed (FDM) channelization of a RF band may have narrow equal bandwidth channels throughout the band as well as wider channels whose bandwidth are even multiples of that of the bandwidth of the narrowest channel. Regulations often dictate that wider bandwidth FDM channels share the same center frequencies as the narrowest channel, resulting in spacing for channels whose width is 2n times the bandwidth of the narrow channel to be (2n+1) times the bandwidth of the narrowest channel. Examples of such spectral bands include VHF and UHF spectral bands for private land mobile services, in which multiple channels of different bandwidths will share the same the center frequency. FIG. 1 illustrates an example for a VHF spectral band. The wideband channels 102, narrowband channels 104, and very narrowband channels 106 share the same center frequencies 108 are shown.

Mixed-use (voice and data) frequency channels in licensed bands require that a transceiver assess and identify channels available for secondary use. To achieve spectral awareness, a radio may employ various learning methods to sense and detect the primary user activity. Generally, the more knowledge that a radio has regarding the primary user (PU) in a band, the easier it is for it to accurately establish the PU's presence. For example, knowing a PUs' digital signal characteristics such as modulation technique, pilots, spreading codes, preambles, and packet format can be used improve a radio's detection ability. However, detection schemes derived a priori from such knowledge increase complexity and computational demands.

Without a priori knowledge, or when dealing with a mix of voice and data signals, a radio typically must resort to detecting energy in each sub-band to determine whether a primary user is transmitting by comparing a detected energy level of each channel to a threshold that depends on the receiver's perception of levels of thermal noise. If the measured energy exceeds that threshold for any given sub-band, that sub-band is then deemed as occupied and in-use. This type of detection can be effective unless the received signal strength is close to or under the perceived noise floor. For the method to be most effective, a radio needs not only accurately filter and distinguish transmissions that may be present, but also to make accurate assessment of changes to a dynamically changing noise floor.

SUMMARY

Disclosed below are representative embodiments of methods and apparatus for sensing use of a radio spectrum band containing variable bandwidth channels.

For a radio frequency (RF) band that is divided into a predetermined number of narrowband channels and that has at least one variable width channel with a bandwidth equal to an integer multiple of the bandwidth each of the narrowband channels, one representative embodiment of an apparatus comprises a radio adapted to decide the occupancy of the at least one variable width channel in the RF band by classifying each the narrowband channels corresponding to the variable width channel and each of a plurality of sub-bands with bandwidths equal to the bandwidths of narrowband channels but with center frequencies shifted by one-half of the bandwidth of the narrowband channel and overlap with the bandwidth of the variable width channel as containing signal or noise based on measured energy levels.

DETAILED DESCRIPTION OF EXEMPLARY EMBODIMENTS

In the following description, like numbers refer to like elements.

FIG. 1 illustrates a simplified, representative example of such a channel scheme for a given RF band. It comprises five wideband channels 102, ten narrowband channels 104, and twenty ultra-narrow band channels 106, with each center frequency 108 shared by a wideband, narrowband and ultra-narrowband channel.

Figure 2:
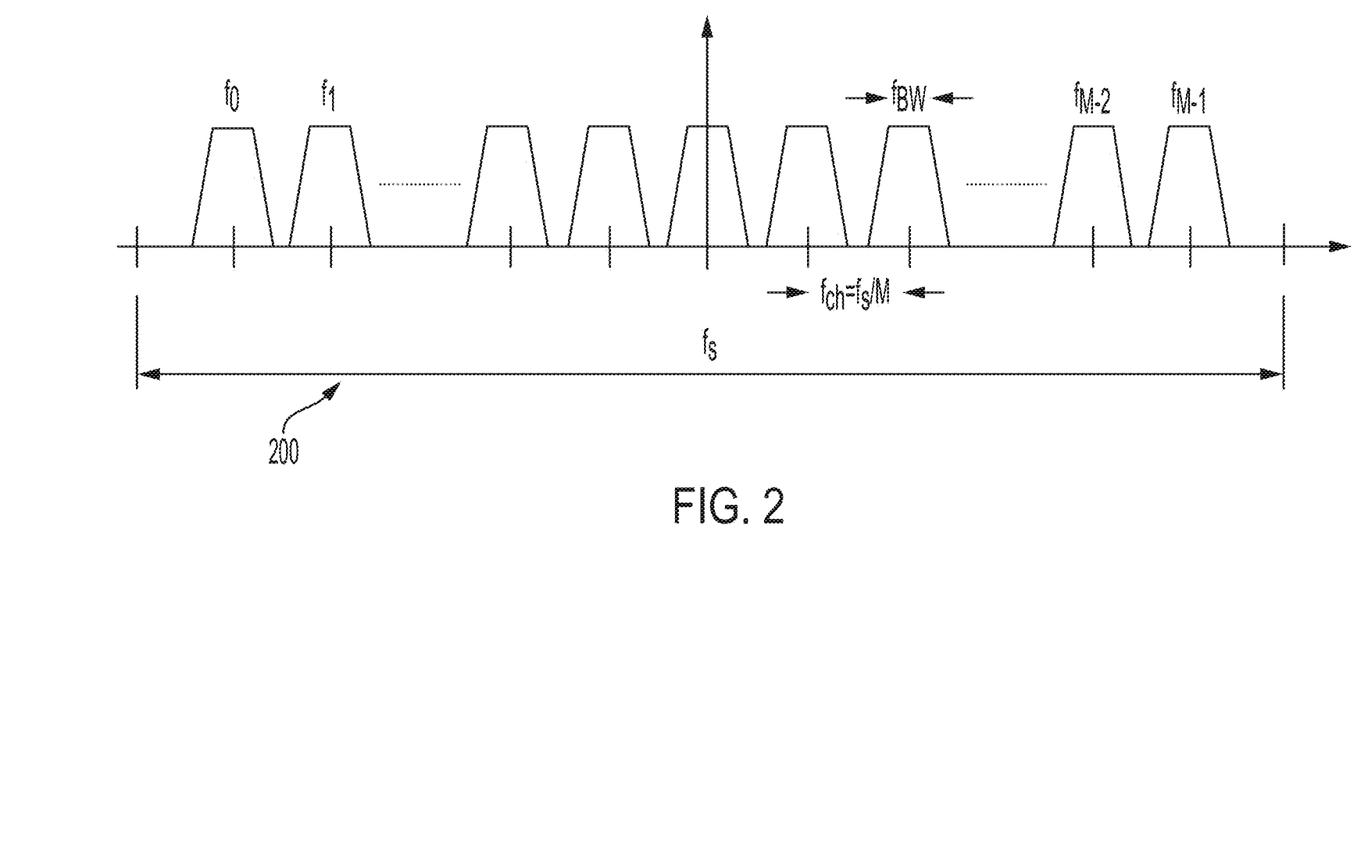
FIG. 2 is a schematic illustration of a full spectrum of given spectral band for FDM channels, with each channel occupying the same bandwidth and the channels being equally spaced throughout the band.

FIG. 2 illustrates an example of a RF band or spectrum 200 for an frequency division multiplexed (FDM) signal for a given RF band L. The band comprises "M" narrow channels. The bandwidth of each channel is "$f_{BW}$", and the channel spacing is equal to $f_s/M$, where $f_s$ is the width of the RF band 200. In this example each narrow channel occupies the same bandwidth and the channels are equally spaced throughout the band. Wider channels (not shown in FIG. 2) will be, under most channel schemes, even multiples of the narrow channel's bandwidth. Channel schemes usually require that wider channels share a center frequency with a narrow channel, resulting in spacing or channels whose width is 2n times the bandwidth of the narrow channel to be (2n+1) times the bandwidth of the narrow channel.

The description below assumes that for a given RF band that it has a channel scheme includes a plurality of narrow channels of equal bandwidths with center frequencies spaced at regular intervals, like the example shown in FIG. 2, and wideband channels with bandwidths that are 2n, where n is integer, times the bandwidth of the narrow channels and share a center frequency with one of the narrow channels.

A digital radio receiver functions or acts like a conventional radio but processes a digitized version of an RF or IF frequency division multiplexed signal for the entire RF band. After being processed by an RF stage, the digital receiver samples this FDM signal to create a discrete, time-invariant signal x(n), where n is an integer value, and has been sampled. Signal processing in a digital radio receiver typically uses a set of independent down-conversion processes that down-convert and filter sampled FDM signal into separate baseband signals, one for each channel, for detection of a transmitted signal using a detection stage.

The processing of sampled FDM signal after the RF stage is typically carried out by elements implemented by programs running on one or more general purpose processors or digital signal processors (DSP), one or more programmed field programmable gate arrays (FPGA), one or more application specific integrated circuits, or a combination of any two or more of them. A system on a chip may also include in some cases an analog RF stage.

Figure 3:
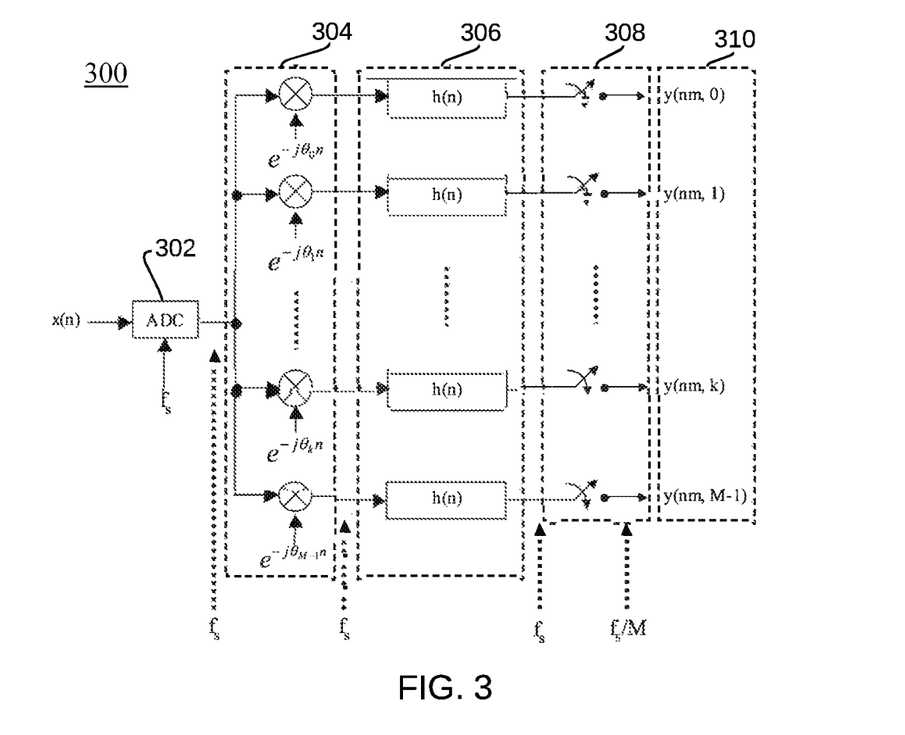
FIG. 3 is a schematic illustration of a conventional digital channelizer using digital down-converters to convert a digitized RF signal to a baseband signal, digital baseband filters, and down-samplers.

FIG. 3 illustrates an example of a conventional channelizer 300 for separating a sampled FDM signal for a given RF band into the baseband channels for signal detection. The RF or IF signal is converted to a digital signal using an analog to digital converter (ADC) 302 at a sampling frequency $f_s$ to create a discrete signal x(n) that comprises a series of samples. The sampled FDM signal is then down-converted to a baseband for each channel, using complex-valued sinusoid mixers 304. There is one mixer for each channel. Each baseband signal is then filtered using one of the filters in a bank a low pass filters 306, each with an impulse response h(n), to reduce the bandwidth of the signal to the bandwidth of the particular channel. Low pass filtering is followed by down-sampling to a reduced sampling rate in accordance with the reduced bandwidth, which is equal to $f_s/M$ in this example, using down samplers 308 to produce filtered baseband signals 310, one signal y(nm, k) for each channel k, for k=0 to M−1. Using this conventional channelizer approach, all of the signal processing for each of M channels is performed at the input sampling rate $f_s$.

Figure 4:
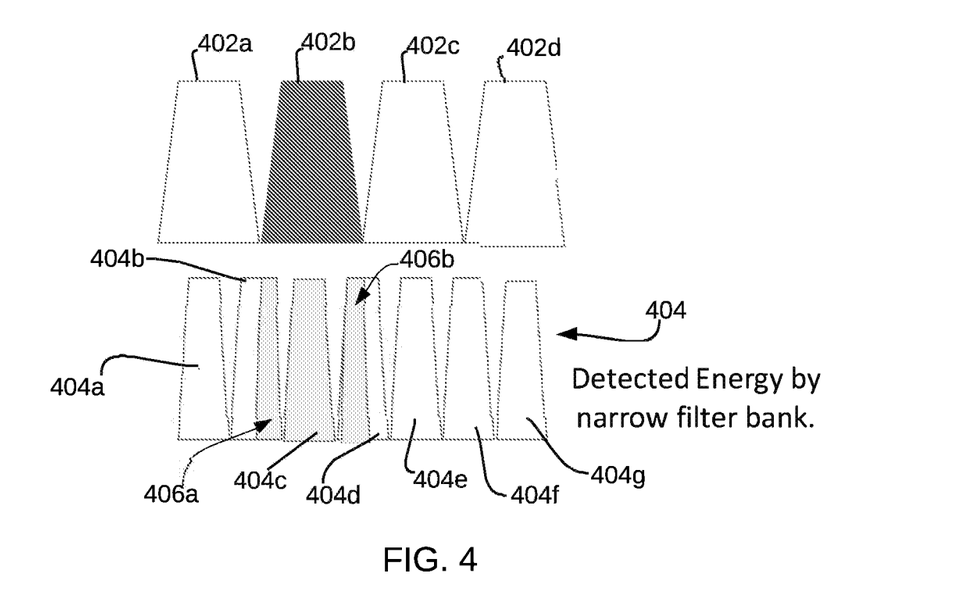
FIG. 4 is a schematic illustration of energy in a transmission in a wideband channel being sensed by a narrowband filter bank.

Referring now to FIG. 4, a conventional narrowband polyphase filter bank or channelizer will be less accurate at determining the occupancy of a wide band channel that overlap multiple narrow band channels. The reason is that wide-band channels will partially overlap at least two narrowband channels. Energy in wide channel transmission will roll-off on either side of it. The roll-offs will be sensed by the filters for narrowband channels that neighbor the narrowband channel that shares the same center frequency as the wideband channel. That energy can go unnoticed, especially in case of low-energy wideband transmission. FIG. 4 represents the energy of the wideband channels 402, comprised of the wideband channels 402*a*, 402*b*, 402*c*, and 402*d*, and the detected energy 404 comprised of detected narrowband filters 404*a*-404*g*. Thus, for example, the energy in wideband channel 402*b* will be detected by the filters for channels 404*b*, 404*c* and 404*d*, with the roll-off energy 406*a* and 406*b* being detected in channels 404*b* and 404*d* that neighbor channel 404*c*, which shares the same center channel frequencies as the wideband channel 402*b*.

Figure 5:
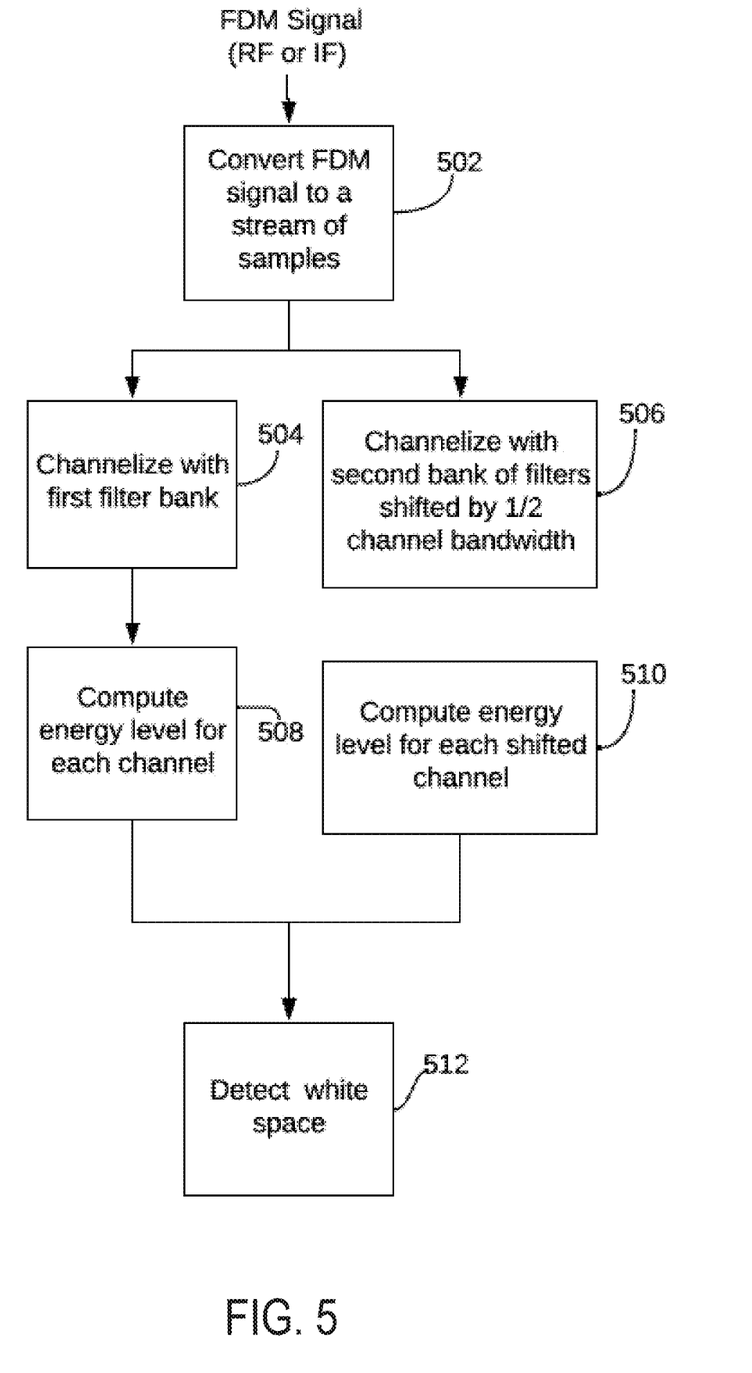
FIG. 5 is a flow diagram illustrating the process in a digital receiver for detecting white space.

FIG. 5 illustrates a representative RF spectrum sensing process 500 embodying a method for detecting white spaces that allows for the energy in each in FDM signal with multiple channel bandwidths—at least M narrowband channels and at least one wideband channel with a bandwidth that is an integer multiple of the narrow channel bandwidth—to be simultaneously sensed with greater efficiency as compared with conventional methods using a multi-pass filtering method.

Distinguishing the residual energy in the ends of a wideband channel from noise, even when the detected energy from the primary transmitter is low, using multiple pass filtering, allows the occupancy of any wideband channel with a bandwidth that is an integer multiple of a narrower channel's bandwidth and that shares the same center frequency of the narrower bandwidth channel to be determined more reliably for at least two reasons. First, if a secondary user mistakenly uses the spectrum at one end of a wideband channel, there could be interference with reception of the wideband signal by a primary receiver, particularly when the distance between the primary receiver and the secondary user's transmitter is sufficiently relatively small. Second, if the residual energy in the channel ends is mistakenly factored into the noise calculations, it can impact the accuracy of the detection process because the detection threshold depends on an accurate determination of the assumed minimum noise energy level in the channel. To further to address this latter issue, the embodiments of a receiver described herein may, optionally, continuously monitor energy levels across the RF band. Detected white spaces are reevaluated relatively frequently to minimize false and missed detections.

Figure 6:
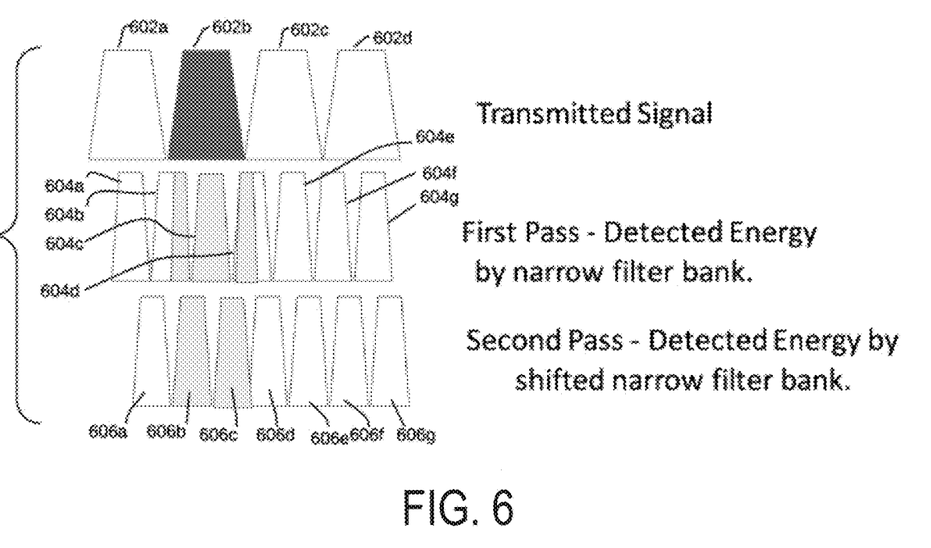
FIG. 6 is a schematic illustration of an example of using dual pass filtering for detecting the energy of a wide channel using a narrowband filter bank.
Figure 7:
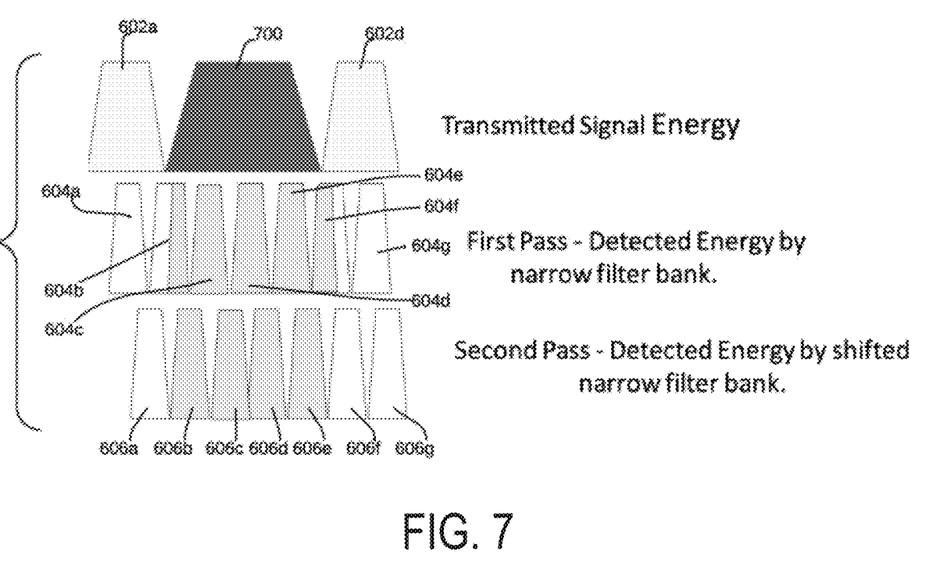
FIG. 7 is a schematic illustration of an example of using dual pass filtering for detecting the energy of a wide channel using a narrowband filter bank.

FIGS. 6 and 7 illustrate examples where a bank of narrowband filters and a bank of shifted narrowband filters can be used to detect more reliably transmissions in a wideband channel with a bandwidth that is a multiple of the bandwidths of the filters. In the example of FIG. 6, energy of transmission in wideband channels 602*a*-602*d* are detected using a first bank of narrowband filters 604*a*-604*g* and a second bank of narrowband filters 606*a*-606*g* that are shifted by half the bandwidth of the narrowband filters. The energy from the transmission in channel 602*b* detected by filter 604*c* will be significantly higher than the energy detected by filters 606*b* and 604*d* due to roll off. However, the amount of energy detected by shifted filters 606*c* and 606*d* should be significantly higher than the energy levels detected by filters 604*b* and 604*d*. Therefore, based on the energy detected, a receiver could decide that the wideband channel 602*b* was occupied based on the detected level of energy by filter 604*c* and shifted filters 606*b* and 606*c*, even if the energy levels detected by filters 604*b* and 604*d* are too low to distinguish from noise.

In the example of FIG. 7, if there is a transmission in the same RF band of a channel 700 with a bandwidth that is four times the bandwidth of the filters 604*a*-604*g* and shifted filters 606*a*-606*g*, the amount of energy detected by filters 604*b* and 604*f* will be less than detected in filters 606*c*-606*e*, and might be lower than the noise level. However, the receiver can a reliable decision that the wideband channel 700 is occupied using the energy levels detected by filters 604*c*-604*e* and by shifted filters 606*b*-606*e*.

Referring back to FIG. 5, RF spectrum sensing process 500 starts at step 502 by sampling with an analog to digital converter (ADC) in a radio receiver or transceiver an FDM signal that has been received for a given RF band. The FDM signal is comprised of a plurality of multiplexed channels that may have variable, i.e. different, bandwidths. The sampled signal can be either the RF signal or an intermediate frequency (IF) signal derived from the RF signal. (In this description a reference to the RF signal is intended to also be a reference to an IF signal generated from the RF signal.) The sampling rate is chosen to accommodate the total bandwidth occupied by the multiple channels.

The sample FDM signal is then filtered through each of two channelizers. In the first filtering, represented by step 504, the channelizer is configured for separating the FDM signal into sub-bands with center frequencies that coincide with the center frequencies of each of the narrowband channels. In the second filtering, represented by block 506, each of the channelizer is configured for separating the FDM signal into sub-bands center frequencies that offset by half a narrow channel's bandwidth. All of the sub-bands have the same bandwidth as the narrow channels. The first filtering allows for detection of the energy from a wideband transmission in at least the sub-band sharing the same the same center frequency. The second filtering allows for the detection of residual or roll-off energy from the wideband channel transmission in neighboring sub-bands that could be mistaken as noise if only the output of the first filtering process were used.

Examples of channelizers that can be used include the conventional filter bank, such as the one shown in FIG. 3, or a more efficient polyphase filter bank, such as the example described in connection with FIGS. 8 and 9.

A final channel occupancy determination combines the sensed energy from both filtering processes. After separation of the channels, the receiver measures or computes an energy level for each sub-band from the first channelization at step 508. The receiver also measures or computes, as indicated by step 510, the energy level in each sub-band from the second channelization. A detector or spectrum sensing process receives or acts on the computed energy levels of each sub-band and, as indicated by step 512, classifies using predetermined detection criteria and the computed energy levels each channel as either noise, which is white space, or signal, meaning that channel is occupied.

This method can be applied to improve detection any wideband channel that has a bandwidth that is a multiple of a narrowband channel and shares the same channel center as one of the narrowband channels.

Figure 8:
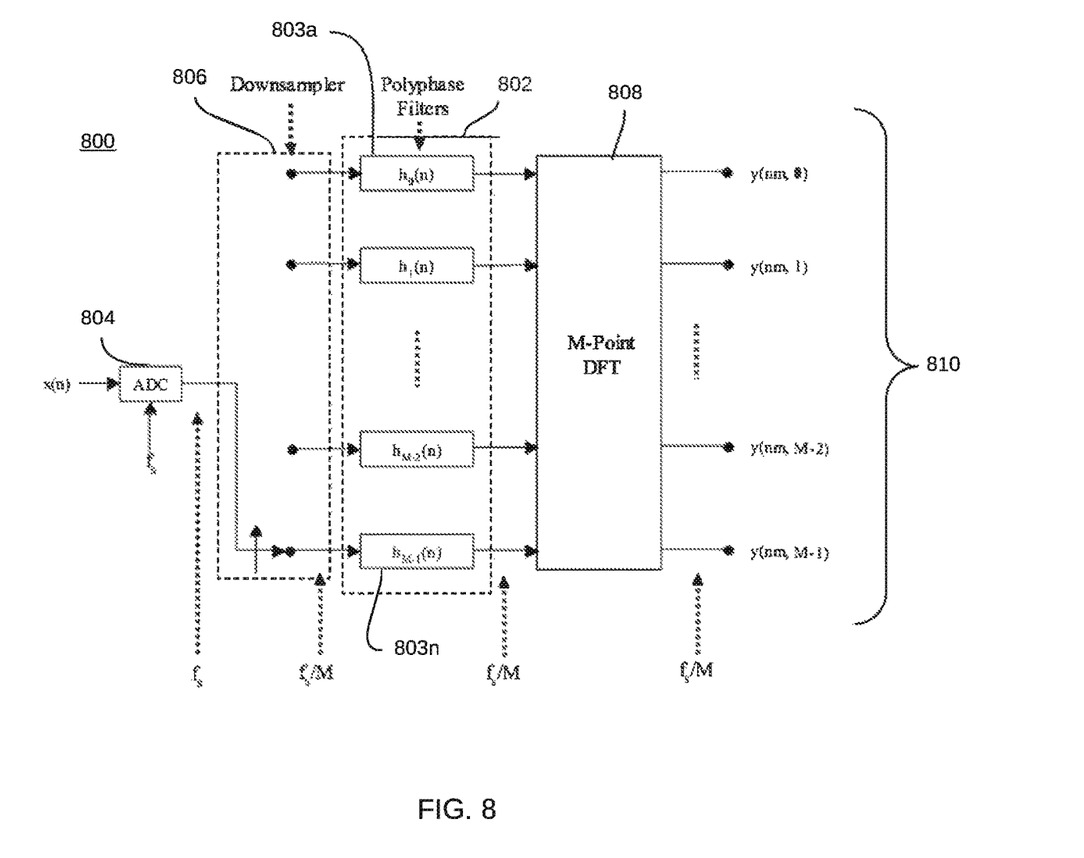
FIG. 8 schematically illustrates a channelizer using a polyphase filter.
Figure 9:
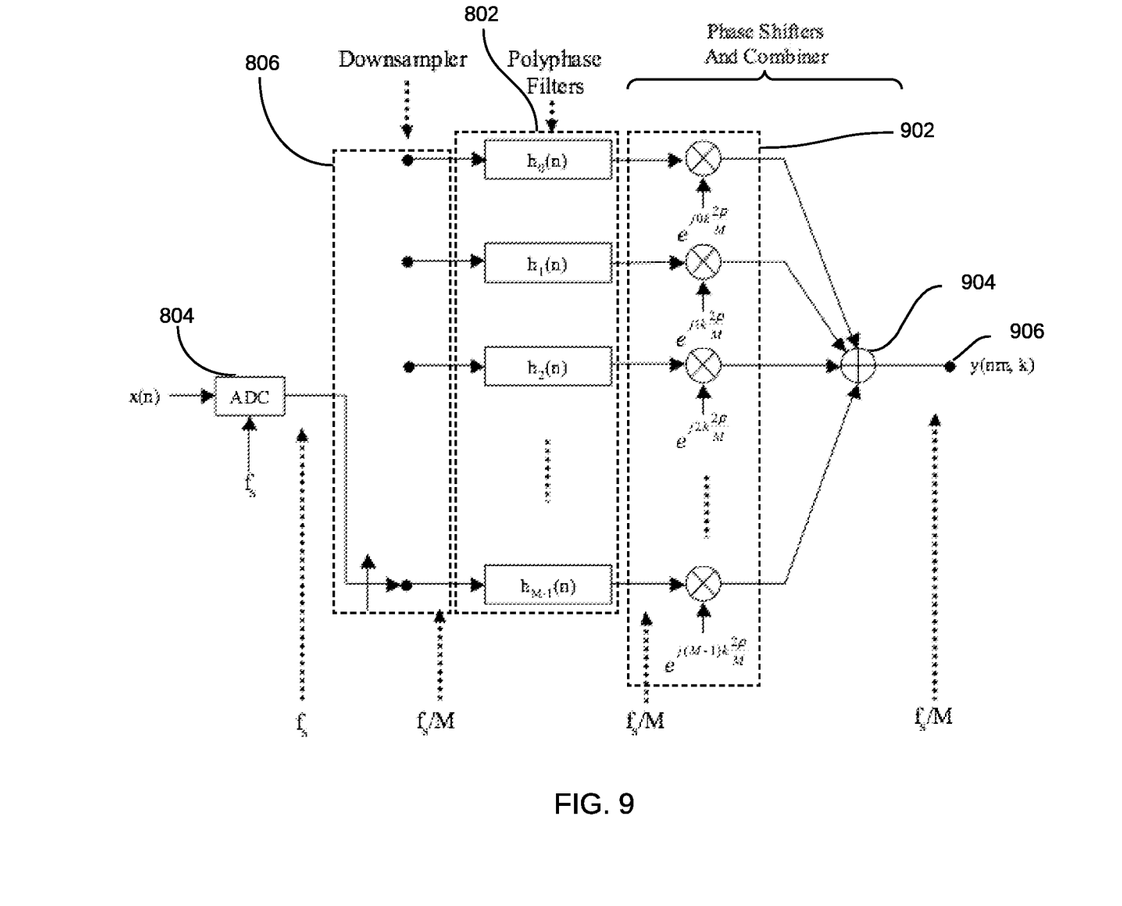
FIG. 9 schematically illustrates a phase shifting and combining network of the polyphase channelizer of FIG. 8 for a single channel.

Referring now to FIGS. 8 and 9, the channelization of the FDM signal at steps 504 and 506 of process 500 can be accomplished more efficiently by a channelization process that uses a channelizer employing polyphase decomposition with a bank of low-leakage bandpass filters to channelize the signal for computation or measurement of the energy levels of variable-width sub-bands within the FDM signal. Channelizer 800, schematically illustrated by FIG. 8 is a representative example of a channelizer for carrying out this process. A conventional channelizer like channelizer 300 is transformed into the polyphase channelizer 800 in a manner that maintains the equivalency of the two approaches while at the same time significantly reducing the implementation complexity. First, the down-conversion (i.e., the mixing) and filtering operations are exchanged, so that the filtering is done before the mixing. Second, the acts of filtering followed by down-sampling are interchanged so that down-sampling is followed by filtering. The result is that channelizer 800 separates the channels using a single bank of filters and phase shifters that employ polyphase decomposition.

After an M-channel FDM signal (RF or IF) is sampled by ADC 804 at sampling rate $f_s$ in accordance with the bandwidth occupied by the M channels, the samples are immediately down-converted using down-sampler or input commutator 806 (FIG. 8) that creates M down-sampled signals with samples, each having a frequency equal to the sampling frequency $f_s$ divided by M ($f_s$/M). Because the sampling rate is an integer multiple of the channel spacing, the down-sampling of the digitized FDM signal aliases all M channels down to 0 Hz. This means that after down-sampling, each of the channels have a 0 Hz center frequency and thus will interfere with each other when combined.

Each down-sampled signal is then filtered with a different filter in a bank of polyphase bandpass filters. Filter bank 802 comprises an array of M bandpass filters 803*a*-803*n*, where M is the number narrowband channels in the FDM signal. However, each filter is a frequency-shifted version of a low-leakage, prototype lowpass filter, with an impulse response $H_k(n)$, where k=0 to M−1. Each of the filters is derived from a prototype filter, such as the baseband filter used in a convention channelizer shown in FIG. 3, by delaying and down-sampling the prototype filter by a factor M, where M is the number of channels in the FDM signal, in such a way that each filter has a different sampling phase relative to the other filters. After each channel is filtered, a phase shifting network receives the output of each polyphase filter 803*a*-803*n*. The output each of the polyphase filters 803*a* to 803*n* is phase shifted by an array of phase shifting networks before it is combined to produce a baseband signal for a channel.

FIG. 9 illustrates the channelizer 800 with a phase shifting network for just one channel of channelizer 800. Not shown are the phase shifting networks for the other channels of the channelizer 800. Each phase shifting network comprises an array of phase shifters 902 (FIG. 9) and a combiner 904 that sums the output from each phase shifter in the array. There is an array of phase shifters 902 and a combiner 904 for each channel k, where k=0 to M−1. Each of the phase shifting networks thus receives the outputs from all of the filters in the bank of bandpass filters 802 is provided to each of the phase shifting networks. The outputs from each of the phase shifters for a given channel k are summed using combiner 904. The summing constructively combines components for the given channel and destructively combines the components of all of the other channels. The unwanted channels cancel each other out, so that the baseband output 906, y(nm,k), for the given channel remains. The channelizer thus collectively produces M baseband outputs y(nm,k) 810, one for each channel, as indicated by FIG. 8.

Referring again to FIG. 8, a discrete Fourier transform (DFT) 808 is used, in this embodiment, to implement the phase shifting networks, each with an array of phase shifters and a combiner, each of channels. A fast Fourier transform (FFT) process could be used instead of a DFT. The DFT 808 produces the baseband output y(nm,k) for each of the channels, which are collectively referenced by reference number 810.

A bank of polyphase filters offers several possible advantages relative to a set of individual down-conversion receivers such as those used the channelizer of shown in FIG. 3. One such advantage is a reduction in system resources required to perform the multichannel signal processing. With a channelizer implemented with a bank of polyphase filters—a polyphase channelizer—the output of the ADC is immediately down-sampled, so that all the subsequent signal processing is performed at the reduced rate $f_s/M$. Also, because the polyphase filters operate on every Mth input sample, each of the polyphase filters have M times fewer coefficients compared to a conventional baseband filter used in the channelizer 300 of FIG. 3.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the specific or representative embodiments and structures that are illustrated or described.

What is claimed is:

1. A spectrum sensing method for determining channel occupancy within a predetermined radio frequency (RF) band with variable width channels, the RF band being divided into a predetermined number of narrowband channels that each have an equal narrowband channel bandwidth and a center frequency that is separated by the width of the RF band divided by the predetermined number of narrowband channels, the variable width channels including at least one wideband channel with a bandwidth that is an integer multiple of the narrowband channel bandwidth; the method comprising:

receiving with a radio receiver a frequency division multiplexed (FDM) signal for the RF band, the radio receiver comprising an analog to digital converter, a first channelizer, and a second channelizer;

sampling with the analog to digital converter the FDM signal;

channelizing the sampled FDM signal using the first channelizer, the first channelizer being adapted for separating the FDM signal into baseband signals for each of a first set of sub-bands with center frequencies corresponding to the narrowband channels and bandwidths equal to the narrowband channel bandwidth;

channelizing the sampled FDM signal using the second channelizer, the second channelizer being adapted for separating the FDM signal into baseband signals for a second set of sub-bands having the same bandwidth as the sub-bands in the first set of sub-bands but each center frequency shifted by half of the narrowband channel bandwidth as compared to the first set of sub-bands;

for each sub-band in the first and second sets of sub-bands, measuring an energy level of the sub-band and giving the sub-band a classification based on the measured energy level, the classification indicating whether the sub-band contains a signal; and determining channel occupancy for the at least one wideband channel based on the classification of one of the sub-bands in the first set of sub-bands that has a center frequency corresponding to a center frequency of the wideband channel, and at least two sub-bands in the second set of sub-bands overlapping the wideband channel.

2. The method of claim 1, wherein at least one of the first and second channelizers separates the sampled FDM signal using polyphase decomposition.

3. The method of claim 1, wherein the at least one of the first and second channelizers separates the sampled FDM signal into baseband signals by:

down-sampling the sampled FDM signal into M digital signals that each have a sample rate equal to $f_s/M$, where M is the number of sub-bands and $f_s$ is the frequency at which the FDM signal was sampled;

filtering each of the M digital signals with a polyphase filter bank; and for each sub-band, generating a baseband signal for each sub-band by phase-shifting the output from each polyphase filter and combining the phase-shifted outputs to constructively combine portions of the output from each polyphase filter that corresponds to the sub-band and destructively combines the portions that correspond to the other sub-bands.

4. The method of claim 3, wherein each of the polyphase filters in the polyphase filter bank is derived from a prototype filter by delaying and down-sampling the prototype filter by a factor M, where M is the number of channels in the FDM signal, whereby each polyphase filter has a different sampling phase relative to the other filters.

5. A spectrum sensing radio operable for sensing usage within a predetermined radio frequency (RF) band with variable width channels, the RF band being divided into a predetermined number of narrowband channels that each have an equal narrowband channel bandwidth and a center frequency that is separated by the width of the RF band divided by the predetermined number of narrowband channels, the variable width channels including at least one wideband channel with a bandwidth that is an integer multiple of the narrowband channel bandwidth; the spectrum sensing radio comprising:

an analog to digital converter for sampling a frequency division multiplexed (FDM) signal for the RF band that is received by the spectrum sensing radio to convert it to a digital FDM signal;

a first channelizer configured for separating the digital FDM signal into baseband signals for each of a first set of sub-bands with center frequencies corresponding to the narrowband channels and bandwidths equal to the narrowband channel bandwidth;

a second channelizer for separating the digital FDM signal into baseband signals for a second set of sub-bands with the narrowband channel bandwidth but center frequencies shifted by half of the narrowband channel bandwidth as compared to the first set of sub-bands; and a detector for classifying the at least one wideband channel as occupied or not using predefined criteria based on energy levels in at least one sub-band in the first set of sub-bands and at least two sub-bands in the second set of sub-bands, the at least one sub-band in the first set of sub-bands and each of the at least two sub-bands in the second sets of sub-bands overlapping at least partially the at least one wideband channel.

6. The spectrum sensing radio of claim 5, wherein at least one of the first and second channelizers comprises:

a down-sampler for sampling the sampled FDM signal into M digital signals, each of which has a sample rate equal to $f_s/M$, where M is the number of sub-bands and $f_s$ is the frequency at which the FDM signal was sampled;

a polyphase filter bank for filtering each of the M digital signals;

a phase shifting and combiner network adapted to generate for each sub-band a baseband by phase-shifting an output from each polyphase filter and combining the phase-shifted outputs to constructively combine portions of the output from each polyphase filter that correspond to the sub-band and destructively combine the portions that correspond to the other sub-bands.

7. The spectrum sensing radio of claim 6, wherein each of the filters in the polyphase filter bank is derived from a prototype filter by delaying and down-sampling the prototype filter by a factor M, where M is the number of channels in the FDM signal, whereby each filter has a different sampling phase relative to the other filters.

8. The spectrum sensing radio of claim 6, wherein the phase shifting and combiner network is comprised of one of a discrete Fourier transform (DFT) or a fast Fourier transform (FFT) process.

* * * * *